INVENTORS
DONALD J. BAXTER
ROBERT L. DANGLER
WILLIAM E. HANRAHAN
BY William V. Ebs
ATTORNEY

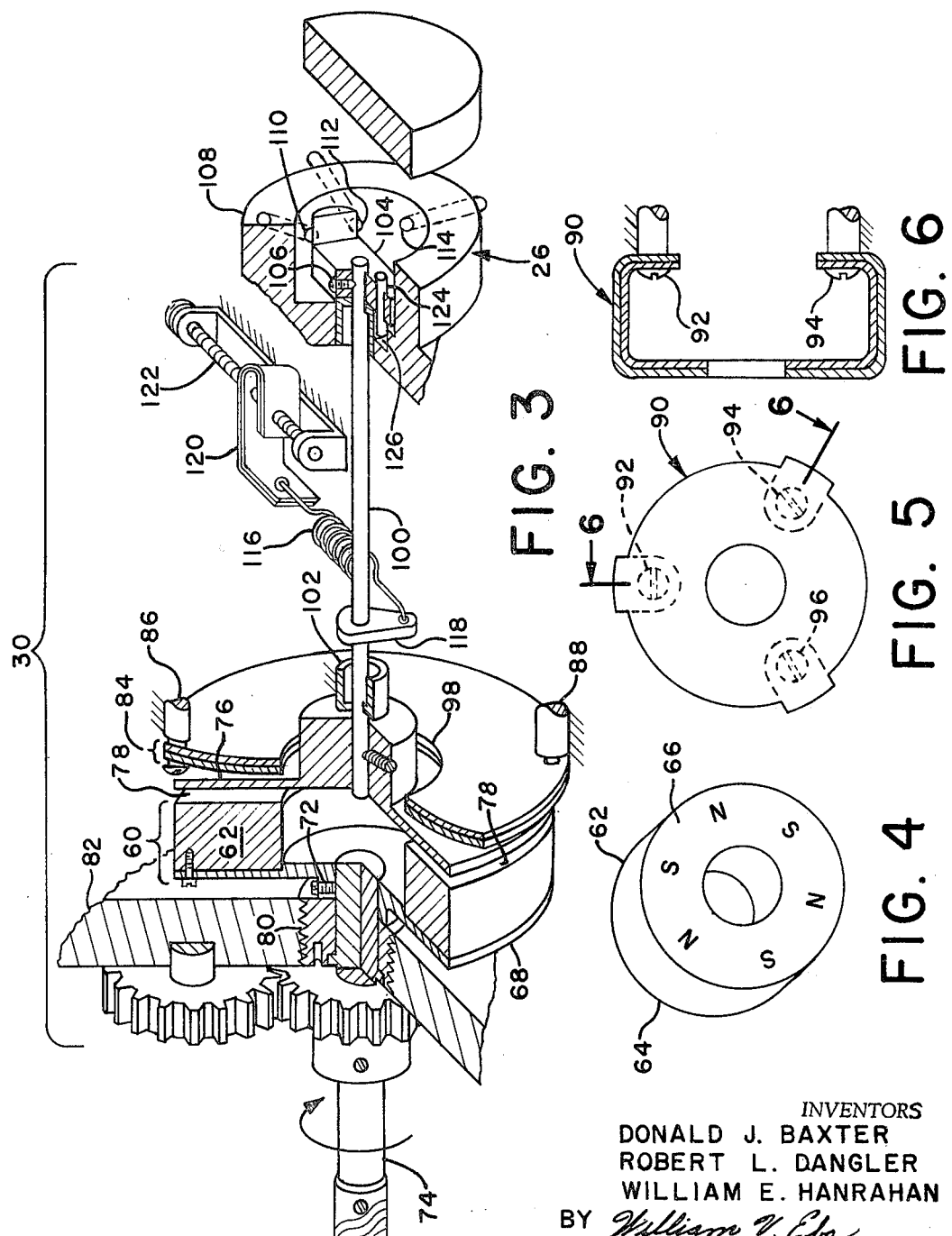

United States Patent Office 3,502,167
Patented Mar. 24, 1970

3,502,167
GOVERNING SYSTEM FOR ENGINES AND
AUTOMOTIVE VEHICLES
Donald J. Baxter, South Euclid, Robert L. Dangler, Shaker Heights, and William E. Hanrahan, Mentor, Ohio, assignors to The Marquette Metal Products Company, a corporation of Ohio
Filed Sept. 14, 1967, Ser. No. 667,756
Int. Cl. B60k 31/00
U.S. Cl. 180—107                                    5 Claims

ABSTRACT OF THE DISCLOSURE

A governing system for automotive vehicles is operated by intake manifold air pressure in a manner dependent upon both vehicle and engine speed to exercise control over the position of an engine throttle to thereby prevent excessive vehicle speed and engine damage.

Background of the invention

Our invention relates to governing systems for engines and automotive vehicles. The invention is particularly intended for automotive vehicles wherein it may be used to limit the speed of the vehicle and prevent damage to the engine.

It is an object of the invention to provide an improved governing system for engine driven vehicles effective to limit load on the engine as well as engine and vehicle speed.

It is another object of the invention to provide a speed and load governing system which is particularly applicable to automotive vehicles in which an auxiliary throttle is moved toward a closed position whenever engine speed, vehicle speed or load on the engine increases.

It is a further object of the invention to provide an engine governing system in which an auxiliary throttle is maintained in an open position by engine-generated suction force acting on throttle actuating mechanism and urged by spring means toward a closed position upon a reduction in such suction force in response to an increase in load on the engine.

It is also an object of the invention to provide a tamper-proof speed governing system for automotive vehicles.

It is still another object of the invention to provide an auxiliary throttle and throttle actuator for a speed governing system in a tamper-proof unit.

Another object of the invention is to provide an improved governing system for automotive vehicles effective to establish limiting positions for a main throttle of the engine according to engine and vehicle speed.

Other objects and advantages of the invention will become apparent during a reading of the specification taken in connection with the accompanying drawings.

Description of the drawings

FIG. 3 is a perspective view showing one of the control valves of the systems of FIGS. 1 and 2 and speed responsive actuating means for such valve;

FIG. 4 is a perspective view showing a component of the system of FIG. 1;

FIG. 5 is an end view of a modified temperature compensating member and mounting means therefor suitable for use in the speed responsive actuating means of FIG. 3;

FIG. 6 is a sectional view taken on the plane of the line 6—6 of FIG. 5.

Detailed description

Figures 1, 2:
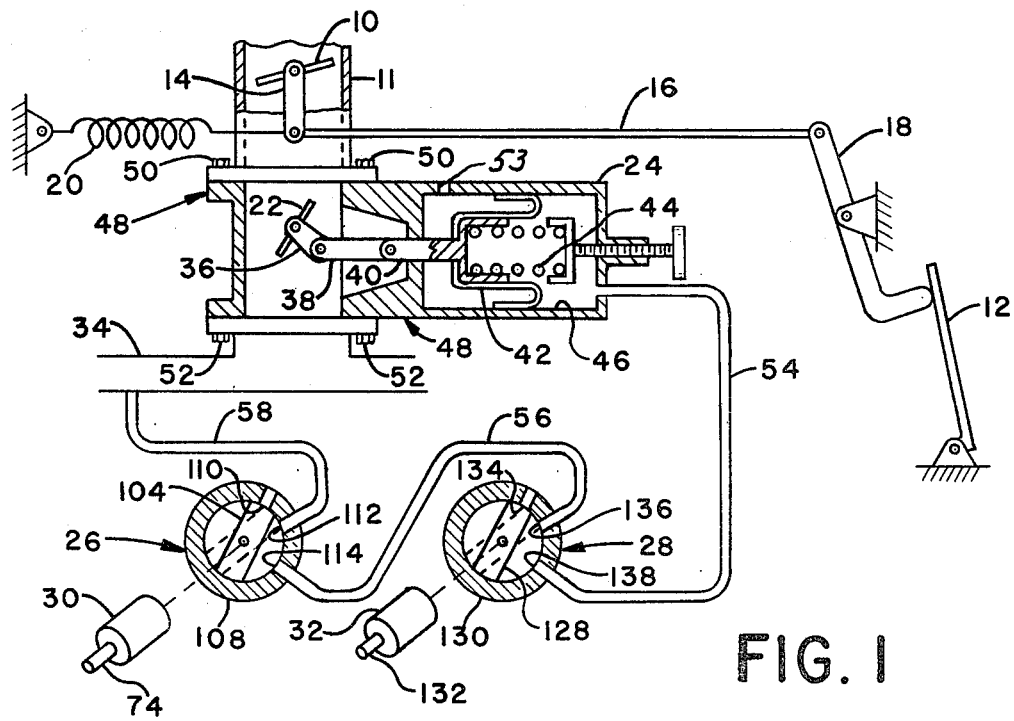
FIG. 1 is a schematic drawing showing engine speed, vehicle speed, and engine load governing system according to the invention.
FIG. 2 is a schematic drawing showing a modified form of governing system according to the invention.

Referring to FIG. 1 of the drawings, reference character 10 designates an engine throttle such as found in the carburetor 11 of a gasoline operated engine. As shown, such throttle 10 is arranged for conventional control by the accelerator pedal 12 of an automotive vehicle, the throttle 10 being connected to the pedal through arm 14, and the links 16 and 18. Depression of the pedal 12 opens throttle 10 against the force of return spring 20 which tends to maintain the throttle in its illustrated idle position.

An auxiliary engine throttle 22, servo actuator 24, control valves 26 and 28, speed responsive valve actuating mechanisms 30 and 32, and a pressure source which is preferably an intake engine manifold 34 producing less than atmospheric pressure are components of a governing system according to the invention for controlling the speed of a vehicle, the speed of its engine and load on the engine. The auxiliary throttle 22 which is disposed between the main throttle 10 and engine intake manifold 34 connects through linkages 36, 38, and 40 with the servo actuator 24 comprising flexible wall 42 and spring 44 in cylinder 46. Preferably, an encasement is provided for the linkages connecting the throttle 22 and servo actuator 24 to prevent a vehicle operator from disconnecting any such linkages and thereby rendering the governor system ineffective. The system may be conveniently safeguarded against tampering as shown, that is by incorporating the throttle 22, servo actuator 24, and connecting linkages into a unit 48 which encases all such parts and which may be readily assembled between an engine carburetor 11 and engine manifold 34, as at 50 and 52, respectively.

The servo actuator 24 communicates through opening 53 on one side of wall 42 with the atmosphere and connects on the other side of the wall 42 through fluid-carrying line 54 with servo valve 28. Servo valve 28 connects by way of line 56 with the servo valve 26 and servo valve 26 communicates through line 58 with engine intake manifold 34. Servo valve 26 is controlled by valve actuating mechanism 30 in accordance with vehicle speed and servo valve 28 is controlled by actuating mechanism 32 according to engine speed. The said valves, with their actuating mechanisms, are preferably generally similar in construction to the rotary valves and speed responsive actuating mechanisms therefor of the patent application of John B. Day, for Vehicle Speed Control System, Ser. No. 508,051, filed Nov. 16, 1965, which is now U.S. Patent No. 3,340,952.

FIG. 3 shows servo valve 26 and its actuating mechanism 30 in detail, but the drawing may also be taken for the other servo valve 28 and actuating mechanism 32 since the valve and valve actuating mechanism combinations may be identical in construction. Each valve actuating mechanism includes an input member which upon rotation relative to an output member acts upon the output member with a torque that is a measure of the speed of rotation of the input member. Eddy current drag coupling 60 of FIG. 3 is an example of such a coupling. The coupling 60 which is conventional in construction includes a disc magnet 62 of a well known type having a plurality of permanently magnetized portions that form magnetic poles at the end faces 64 and 66 as shown (FIG. 4). The disc magnet 62 is secured at said end faces 64 and 66 to plates 68 and 70 respectively. Plate 68 is affixed as by set screw 72 to an input shaft 74 which rotates according to vehicle speed. Such shaft 74 may be operably connected with the speedometer cable of the vehicle. The eddy current drag coupling also includes copper disc 76 which coacts with the disc magnet 62 as the disc magnet is rotated by shaft 74. The disc is axially spaced from magnet 62 by an air gap 78 which can be adjusted during assembly as required for proper operation of the coupling by means of screw 80 in fixed structure 82.

Rotation of the disc magnet results in a torque on disc 76 in the direction of rotation of the disc magnet due to eddy currents induced in the disc, as lines of flux from the disc magnet cut across the disc, and the resulting reaction between the currents in the disc and magnetic flux producing them. An increase in the speed of rotation of the disc magnet results in an increased torque on disc 76 and a decrease in the speed of rotation of the disc magnet causes torque on the disc 76 to decrease. A bimetallic member of magnetically conductive materials is provided adjacent disc 76. Such member may be formed as shown in FIG. 3 (wherein it is designated by reference character 84), in which case it is secured to fixed structure at only two points as by screws 86 and 88 to permit bowing as indicated when temperature increases. Alternately the bimetallic member may be formed as shown in FIGS. 5 and 6 (wherein it is designated by reference character 90), in which case it may be secured to fixed structure at three or more points as at the locations of screws 92, 94, and 96. The bimetallic member is constructed and assembled in the valve actuating mechanism to bow toward disc 76 upon an increase in temperature to thereby compensate for loss in the magnetic field of disc magnet 62 due to the temperature increase.

Disc 76 is affixed by set screw 98 to a shaft 100 which is rotatably mounted in bearing 102. A movable valve member 104 of the servo valve 26 is also affixed to shaft 100 as by set screw 106 and such valve member is positionable by the shaft in servo valve housing 108 which includes ports 110, 112, and 114. The valve member 104 connects through shaft 100 with a spring 116 which exerts a torque on the shaft in a direction opposite to the direction of rotation of magnet 62. As shown, one end of spring 116 connects with an arm 118 on shaft 100 and the other end connects with a bimetallic temperature compensating bracket 120 which can be adjusted by screw 122 to set tension in spring 116. The bimetallic bracket 120 is constructed to reduce tension in spring 116 upon an increase in temperature and in this way to compensate for losses in the magnetic field of disc magnet 62 not compensated for by the adjacent bimetallic member 84 or 90. By means of the bimetallic member 84 or 90 and the bimetallic bracket 120, substantially all changes in flux due to a temperature change resulting from operation of the engine of the vehicle in which the governor system is installed can be compensated for and torque exerted by disc 76 and rendered independent of temperature variations.

When there is no rotation of shaft 74 and therefore no torque exerted on disc 76, spring 116 causes shaft 100 and valve member 104 to assume a position defined by the engagement of a pin 124 in the valve member with one end of an arcuate slot 126 formed in valve housing 108. Such position of the valve member 104 in the housing 108 of valve 26 is the solid-line outline position of the member shown in FIG. 1. Valve 28 has a valve member 128 which is like the valve member 104. When there is no rotation of shaft 132, valve member 128 assumes a position (solid-line position) in housing 130 of valve 28 corresponding to the solid-line position of the valve member 104 in housing 108. The shaft 132 is an input shaft to valve actuating mechanism 32 and should be connected to the engine of the vehicle in which the governing system of FIG. 1 is installed so that the shaft is subject to rotation according to engine speed rather than vehicle speed.

As shown in FIG. 1, ports 112 and 114 of servo valve 26 connect with lines 58 and 56 respectively, whereas port 110 of such servo valve is open to atmosphere. In servo valve 28, ports 136 and 138 connect with lines 56 and 54 respectively and port 134 is open to atmosphere. At substantially all speeds of the vehicle in which the system of FIG. 1 is installed, less than a maximum speed predetermined for the vehicle by the setting of spring 116 in actuating mechanism 30, valve member 204 remains in its illustrated solid-line position in servo valve 26. At substantially all speeds of the engine of said vehicle, less than a maximum speed predetermined by the setting of a spring (corresponding to spring 116) in actuating mechanism 32, valve member 128 remains in its illustrated solid-line position in servo valve 28. At such vehicle and engine speeds, ports 110 and 134 are blocked to prevent atmospheric air from entering the valves 26 and 28, the engine manifold 34 communicates through line 58, servo valve 26, line 56, servo valve 28, and line 54 with cylinder 46 of the servo actuator 24. Assuming that load on the engine is not excessive, such as at idling speed when manifold suction pressure is of the greatest magnitude, the auxiliary throttle is held fully open (as shown) against against stop means (not shown) by the suction of manifold air pressure in cylinder 46 of actuator 24, and spring 44 is compressed. While flexible wall 42 may be proportioned in relation to the area of throttle 22 so that the suction pressure induced in cylinder 46 by the engine, when "turned-over" by manual or self-starter means (not shown), is of sufficient magnitude to overcome the biasing force of spring 44, and open throttle 22, it is preferred to provide the servo actuator with a stop means (not shown) to arrest movement of throttle 22 toward a fully closed position at a point where the throttle is "cracked" open sufficiently to allow fuel and air mixture to pass into manifold 34 for start-up of the engine.

When the vehicle is accelerated by the operation of pedal 12 to the predetermined maximum vehicle speed, valve member 104 in servo valve 26 is moved to a position wherein its edges overlap ports 110 and 112 as in the illustrated dotted-line position (corresponding to the position of the valve member 104 in FIG. 3). Pressure is increased in servo valve 26 and cylinder 46 of servo actuator 24 by the opening and closing of ports 110 and 112 respectively, whereupon spring 44 acts through linkages 36, 38, and 40 to move auxiliary throttle 22 toward a closed position and so prevent the prescribed maximum vehicle speed from being exceeded.

Racing of the engine and damage which might result therefrom is prevented by the operation in servo valve 28 of valve member 128 which at the predetermined maximum engine speed is caused to assume a position with its edges across ports 134 and 136 such as in the illustrated dotted-line position. Pressure is increased in cylinder 46 of servo actuator 24 by the opening and closing of ports 134 and 136 respectively and auxiliary throttle 22 is moved toward a closed position to limit the engine speed to its prescribed maximum.

As indicated hereinbefore, the governing system of FIG. 1 not only limits maximum vehicle speed and maximum engine speed but also limits load on the engine. It is an important feature of the invention that the system limits the load which may be imposed on the engine although vehicle and engine speeds are less than the predetermined maximums. Load is limited to that which the engine is capable of withstanding without incurring engine damage by the action of spring 44. The spring is preloaded for this purpose, as, for example, by the adjustment of screw 139, to an extent such that whenever engine load is increased above a predetermined magnitude and intake manifold air pressure thereby increased accordingly due to decreased engine speed, auxiliary throttle 22 is moved from its fully open position by the spring to restrict the amount of fuel supplied to the engine.

In the modified governing system of FIG. 2, reference characters 140 and 142 designate servo valves which are like the servo valves 26 and 28 of FIG. 1. Valve actuating mechanisms 144 and 146 which are like the speed responsive valve actuating mechanisms 30 and 32 of FIG. 1 are provided for controlling the servo valves 140 and 142 according to the speed of a vehicle and the speed of its engine respectively. Servo valve 140 includes valve member 148 and servo valve 142 includes valve member 150. Valve member 148 is movable by actuating mechanism 144 in housing 152 relative to ports 154, 156 and 158. Valve member 150 is movable by actuating mechanism 146 in housing 160 relative to ports 162, 164 and 166. As shown, ports 154 and 162 of valves 140 and 142 communicate with the atmosphere. Port 166 of valve 142 connects through line 168 with a servo motor, such as flexible bellows 170 of the type shown in the patent application of John B. Day mentioned hereinbefore and port 164 of the valve 142 connects through line 172 with port 158 of valve 140. Port 156 of valve 140 connects by way of line 174 with engine intake manifold 176.

The bellows 170 is affixed at one end 178 to stationary structure 180, but is movable at the other end where it connects with a shaft 182 that is slidably mounted in the stationary structure at 184. A stop 186 on shaft 182 may be positioned by the bellows to limit movement of engine throttle 188. Throttle 188 which is shown in its idle position connects through arm 190, link 192, expandable connection 194, link 196 and link 198 with accelerator pedal 200 as shown. The throttle 188 may be moved by accelerator pedal 200 from whatever position it may be in at any particular time to a more open position except when stop 202 on expandable connection 194 and stop 186 on the bellows shaft 182 are engaged. When the stops 202 and 186 are in engagement, depression of the pedal 200 results in the compression of spring 205 of expandable connection 194, but the throttle does not move.

At substantially all vehicle speeds less than a predetermined maximum established by adjustment of the speed setting spring in mechanism 144, valve member 148 is in its illustrated solid-line position and air is prevented from entering servo valve 140 through port 154. At substantially all engine speeds less than a predetermined maximum established by adjustment of the speed setting spring in mechanism 146, valve member 150 is in its illustrated solid-line position and air is prevented from entering the valve through port 162. At such vehicle and engine speeds, the bellows 170 is collapsed by engine manifold air pressure which is communicated to the bellows 170 through line 174, servo valve 140, line 172, servo valve 142 and line 168. Stop 186 on bellows shaft 182 assumes the illustrated solid-line position and the throttle 188 may be moved from its idle position against the force of return spring 204 to more open positions by the depression of accelerator pedal 200 to thereby increase vehicle or engine speed.

At the predetermined maximum vehicle speed, valve member 148 of servo valve 140 is moved to a position wherein its edges overlap ports 154 and 156 (dotted-line position), pressure is increased in the bellows 170 by the opening and closing of ports 154 and 156 respectively, and stop 186 is moved leftward (as viewed in the drawing) by expansion of the bellows to engage stop 202 and so prevent the throttle from being opened further. If the engine is accelerated to its predetermined maximum speed, although vehicle speed remains less than the desired maximum, valve member 150 of servo valve 142 is moved to a position with its edges across ports 162 and 164 (dotted-line position). Pressure is increased in bellows 170 by the opening and closing of the ports 162 and 164 respectively and stop 186 is moved leftward by the bellows to engage stop 202 and to prevent the throttle from being operated by the pedal 200 to further increase the speed of the engine and damage to its parts.

While the preferred embodiments of the invention have been shown and described, it will be apparent to those skilled in the art that still other embodiments are possible, and that various modifications may be made in the mechanisms illustrated and described without departing from the spirit and scope of applicants' invention.

What is claimed is:

1. An internal combustion engine and vehicle speed governing system comprising a primary throttle for controlling the supply of fuel and air mixture to the engine, an auxiliary throttle positioned downstream from said primary throttle with respect to said fuel and air mixture flow to the engine, a pressure responsive servo motor operably associated with the auxiliary throttle to actuate the latter, a source of engine manifold pressure, means including two valves connected to said source of manifold pressure and the servo motor, engine speed responsive means connected with one of said valves for adjusting said valve and controlling pressure in the servo motor and thereby positioning the auxiliary throttle to limit engine speed, and vehicle speed responsive means connected with the other valve for adjusting said valve and controlling pressure in the servo motor to thereby position the auxiliary throttle to limit vehicle speed, said servo motor including biasing means for urging the auxiliary throttle toward a substantially closed position, said servo motor coacting with the auxiliary throttle to maintain the latter in an open position against the urging of said biasing means at engine idling speed and above and allow the auxiliary throttle to move in the direction of the substantially closed position in response to increased pressure in the servo motor due to operation of one of said valves or a predetermined increase in engine manifold pressure.

2. An engine and vehicle speed governing system as defined in claim 1 wherein said valves are connected in series to each other and said pressure source and the servo motor.

3. The apparatus of claim 1 wherein an adjustable means is provided to selectively preload the biasing means.

4. The apparatus of claim 1 wherein said biasing means is a spring.

5. The apparatus of claim 1 wherein said servo motor and throttle are interconnected by a motion transmitting means and wherein a housing encloses the servo motor, auxiliary throttle and motion transmitting means to provide a unitary structure adapted for attachment to the engine.

References Cited

UNITED STATES PATENTS

| | | | |
|---|---|---|---|
| 1,897,324 | 2/1933 | Murrow | 180—105 |
| 2,130,088 | 9/1938 | Howard | 180—109 |
| 2,527,352 | 10/1950 | Christian | 180—108 |
| 2,796,055 | 6/1957 | Cornelius | 123—103 |
| 3,410,361 | 11/1968 | Marie | 180—108 |
| 2,657,918 | 11/1953 | Parker | 123—97 |
| 2,708,979 | 5/1955 | Reynoldson | 123—97 |
| 2,727,501 | 12/1955 | Worth | 123—97 |
| 3,340,952 | 9/1967 | Day | 180—108 |

KENNETH H. BETTS, Primary Examiner

U.S. Cl. X.R.

180—108; 123—103